United States Patent
Miao et al.

(10) Patent No.: US 9,836,092 B2
(45) Date of Patent: Dec. 5, 2017

(54) SUPPORTING ELEMENT AND PORTABLE ELECTRONIC DEVICE INCLUDING SUPPORTING ELEMENT

(71) Applicant: ASUSTeK COMPUTER INC., Taipei (TW)

(72) Inventors: Hwa-Kae Miao, Taipei (TW); San-Feng Lin, Taipei (TW); Chih-Hung Weng, Taipei (TW); Chang-Ching Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/385,867

(22) Filed: Dec. 21, 2016

(65) Prior Publication Data
US 2017/0192454 A1 Jul. 6, 2017

(30) Foreign Application Priority Data
Dec. 31, 2015 (CN) .......................... 2015 1 1027042

(51) Int. Cl.
| | | |
|---|---|---|
| H05K 7/00 | (2006.01) | |
| G06F 1/16 | (2006.01) | |
| F16M 13/00 | (2006.01) | |
| F16M 11/10 | (2006.01) | |

(52) U.S. Cl.
CPC ............. G06F 1/166 (2013.01); F16M 11/10 (2013.01); F16M 13/005 (2013.01); G06F 1/1626 (2013.01); *F16M 2200/024* (2013.01)

(58) Field of Classification Search
CPC ....................................................... H05K 7/00

USPC ..................................................... 361/679.01
See application file for complete search history.

(56) References Cited

U.S. PATENT DOCUMENTS 8,282,064 B2 * 10/2012 Li ........................... F16M 11/10
                                                     248/372.1
2006/0043253 A1    3/2006 Huang et al.

FOREIGN PATENT DOCUMENTS

| CN | 201663778 | 12/2010 |
|---|---|---|
| CN | 203840410 | 9/2014 |
| TW | M262639 | 4/2005 |
| TW | M473468 | 3/2014 |
| TW | 201501616 | 1/2015 |
| TW | M505861 | 8/2015 |

* cited by examiner

*Primary Examiner* — Jerry Wu
(74) *Attorney, Agent, or Firm* — JCIPRNET

(57) ABSTRACT

A support unit comprising a cover, a positioning unit and a bracket is provided. The cover is pivotably connected to a housing of the portable electronic device and can be received in the housing. The positioning unit is fixed to the housing and includes a plurality of limiting recesses. The bracket includes a first end and a second end that opposite. The first end is connected to the positioning unit, and the second end is pivotably connected to the cover. When the cover is expanded out of the housing, the first end of the bracket is driven by the cover to move relative to the positioning unit, and then the first end of the bracket is engaged with a limiting recess of the positioning unit to fix the expansion angle of the cover relative to the housing. A portable electronic device including the support unit is also provided.

10 Claims, 4 Drawing Sheets

SUPPORTING ELEMENT AND PORTABLE ELECTRONIC DEVICE INCLUDING SUPPORTING ELEMENT

CROSS-REFERENCE TO RELATED APPLICATION

This application claims the priority benefit of China application serial No. 201511027042.5, filed on Dec. 31, 2015. The entirety of the above-mentioned patent application is hereby incorporated by references herein and made a part of specification.

BACKGROUND OF THE INVENTION

Field of the Invention

The invention relates to a support unit and, more specifically to, a portable electronic device with a support unit.

Description of the Related Art

Common portable electronic devices, such as smartphones or tablet computers, are popular due to portable and a function of sending/receiving information instantly. Users usually hold a tablet computer or place the tablet computer on a table in the usage. However, users easily get tired when watching the screen of the computer for a long time if the computer is placed on the table or when holding the computer for a long time.

BRIEF SUMMARY OF THE INVENTION

According to a first aspect, a support unit adapted to a portable electronic device is provided. The support unit includes a cover, a positioning unit, and a bracket. The cover is pivotably connected to a housing of the portable electronic device and is adapted to be received in the housing. The positioning unit is fixed to the housing and includes a plurality of limiting recesses. The bracket includes a first end and a second end that are opposite to each other. The first end is connected to the positioning unit, and the second end is pivotably connected to the cover. When the cover is expanded out of the housing, the first end of the bracket is driven by the cover to move relative to the positioning unit, and then the first end of the bracket is engaged with one of the limiting recesses of the positioning unit to fix the expansion angle of the cover relative to the housing.

According to a second aspect, a portable electronic device comprising a housing and a support unit is provided. The support unit includes a cover, a positioning unit, and a bracket. The cover is pivotably connected to the housing and is adapted to be received in the housing. The positioning unit is fixed to the housing and includes a plurality of limiting recesses. The bracket includes a first end and a second end that are opposite to each other. The first end is connected to the positioning unit, and the second end is pivotably connected to the cover. When the cover is expanded out of the housing, the first end of the bracket is driven by the cover to move relative to the positioning unit, and then the first end of the bracket is engaged with one of the limiting recesses of the positioning unit to fix the expansion angle of the cover relative to the housing.

In sum, the support unit is adapted to be received or expanded out of the housing of the portable electronic device. When the support unit is received in the housing, the appearance of the portable electronic device keeps consistency. When the support unit is expanded out of the housing, the first end of the bracket is driven by the cover to move relative to the positioning unit, and then the first end of the bracket is engaged with the limiting recess of the positioning unit to fix the expansion angle of the cover relative to the housing. Thus, the portable electronic device is supported on the table via the bracket and the cover for user's convenience.

BRIEF DESCRIPTION OF THE DRAWINGS

These and other features, aspects, and advantages of the invention will become better understood with regard to the following embodiments and accompanying drawings.

DETAILED DESCRIPTION OF THE EMBODIMENTS

Figure 1:
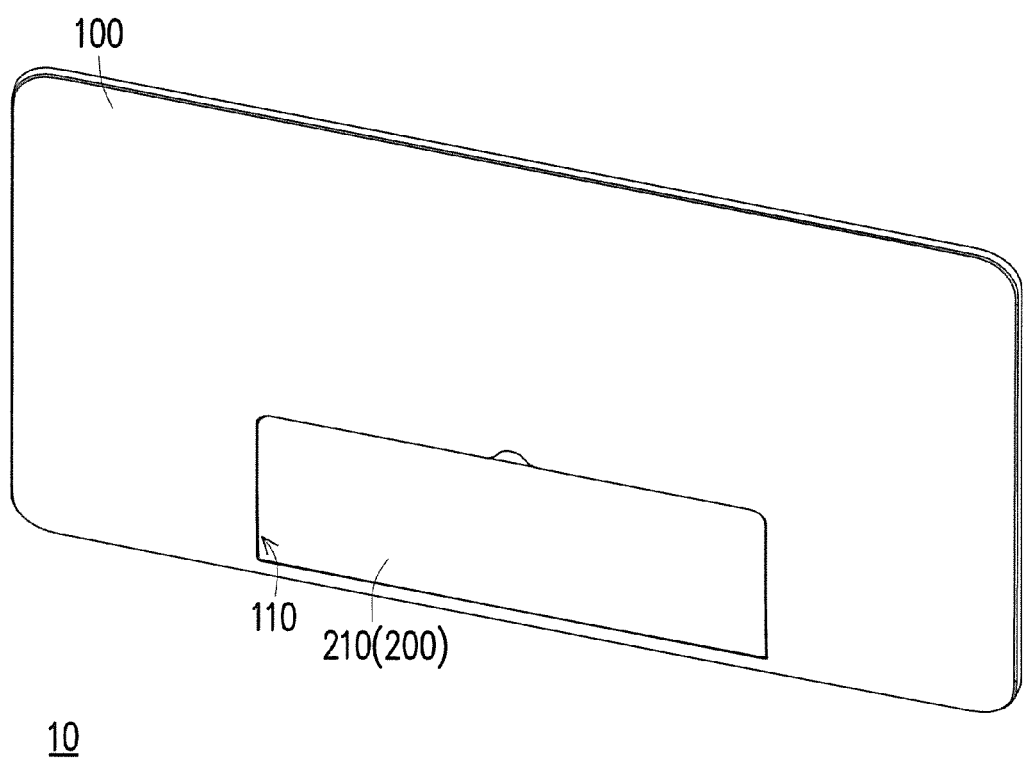
FIG. 1 to FIG. 4 is schematic diagrams showing operation states of a portable electronic device in an embodiment.
Figure 2:
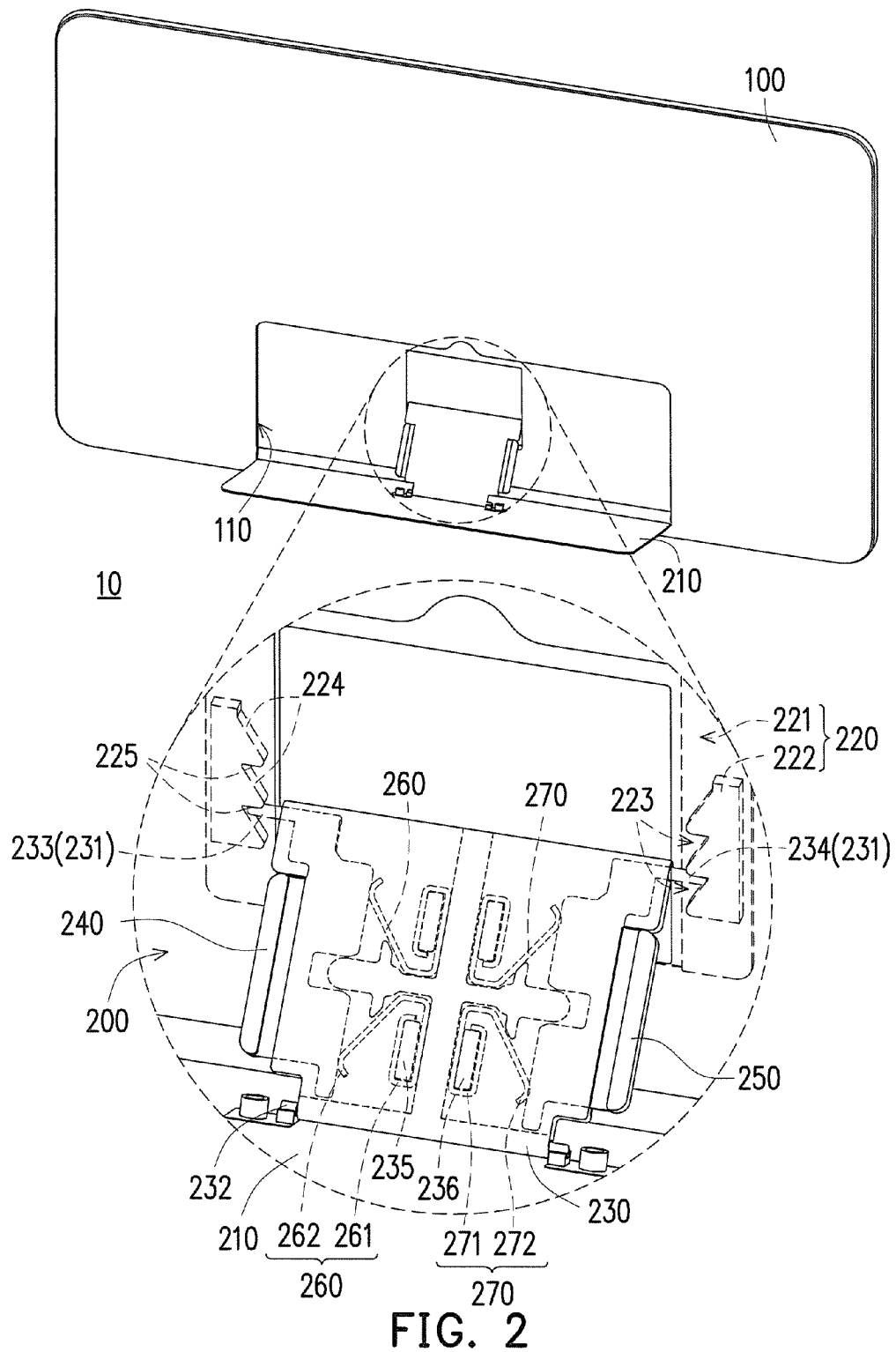

Referring to FIG. 1 and FIG. 2, in an embodiment, a portable electronic device 10, such as a tablet computer or a smartphone, includes a housing 100 and a support unit 200. The housing 100 includes a receiving portion 110. The support unit 200 is receivable in the housing 100 via the receiving portion 110 so that the appearance of the portable electronic device 10 keeps consistency.

In the embodiment, the support unit 200 includes a cover 210, a positioning unit 220 and a bracket 230. The cover 210 is pivotably connected to the housing 100. The cover 210 is receivable in the housing 100 via the receiving portion 110. The positioning unit 220 is fixed to the housing 100. The positioning unit 220 includes two slides 221 that are arranged symmetrically and two toothed limiting structures 222 that are also arranged symmetrically. Each slide 221 is connected to the corresponding toothed limiting structure 222. The toothed limiting structure 222 is closer to the pivotal portion of the cover 210 and housing 100 than the slide 221. The toothed limiting structure 222 includes a plurality of limiting recesses 223. The bracket 230 includes a first end 231 and a second end 232 that are opposite to each other. The first end 231 is connected to the positioning unit 220, and the second end 232 is pivotably connected to the cover 210.

When the cover 210 is received in the housing 100, the positioning unit 220 and the bracket 230 are covered by the cover 210, instead of exposed from the receiving portion 110. Therefore, the appearance of the portable electronic device 10 keeps consistency. The first end 231 of the bracket 230 is connected to the slide 221 of the positioning unit 220. In the embodiment, the first end 231 of the bracket 230 is movable relative to the positioning unit 220. When the cover 210 rotates relative to the housing 100 and moves out of the receiving portion 110 to expand out of the housing 100, the first end 231 of the bracket 230 is driven by the cover 210 along the slide 221 of the positioning unit 220 to the toothed limiting structure 222, and then the first end 231 of the bracket 230 is engaged with one of the limiting recesses 223 of the toothed limiting structure 222 to fix the expansion angle of the cover 210 relative to the housing 100. In other words, when the first end 231 of the bracket 230 is engaged with the limiting recess 223 of the toothed limiting structure 222, the relative positions of the housing 100, the bracket 230 and the cover 210 are fixed temporarily. Thus, the portable electronic device is supported on the table via the bracket and the cover for user's convenience.

In the embodiment, each toothed limiting structure 222 includes a plurality of forward slopes 224 and a plurality of stop faces 225 that are staggered and connected to each other. Any one of the stop faces 225 is connected between two adjacent forward slopes 224. The limiting recess 223 is defined, for example, by the stop face 225 and the abutting forward slope 224. When the first end 231 of the bracket 230 moves along the slide 221 of the positioning unit 220 to the toothed limiting structure 222, the first end 231 passes through a first forward slope 224 to engage with a first limiting recess 223. When the cover 210 rotates relative to the housing 100 continuously, the first end 231 of the bracket 230 is driven by the cover 210 to pass through a second forward slope 224 and then engages with a second limiting recess 223, as shown in FIG. 2. After the first end 231 of the bracket 230 is engaged with the second limiting recess 223, the stop face 225 restricts the movement of the first end 231 towards the slide 221 of the positioning unit 220, and thus the relative positions of the housing 100, the bracket 230 and the cover 210 are fixed temporarily.

Figure 3:
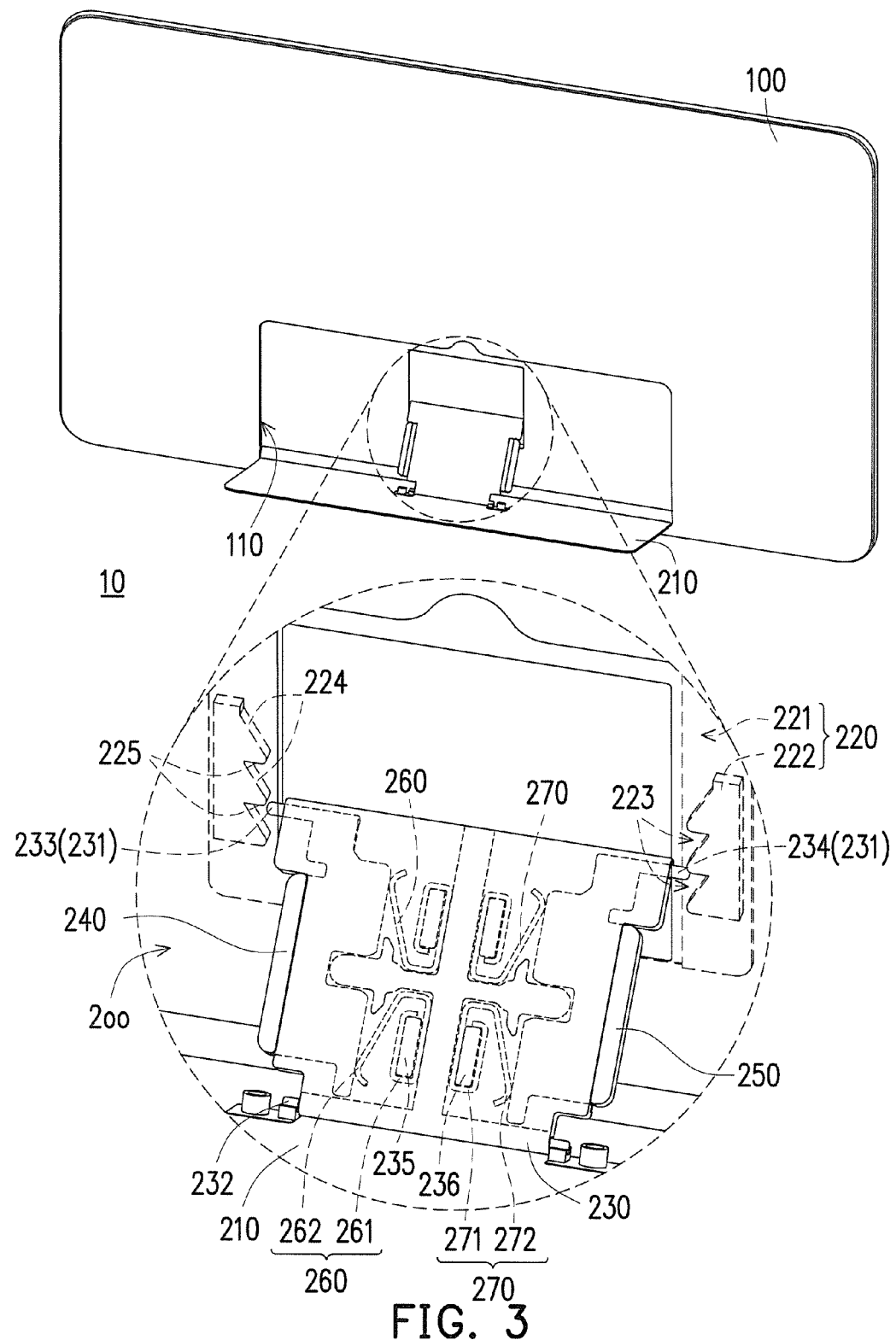
Figure 4:
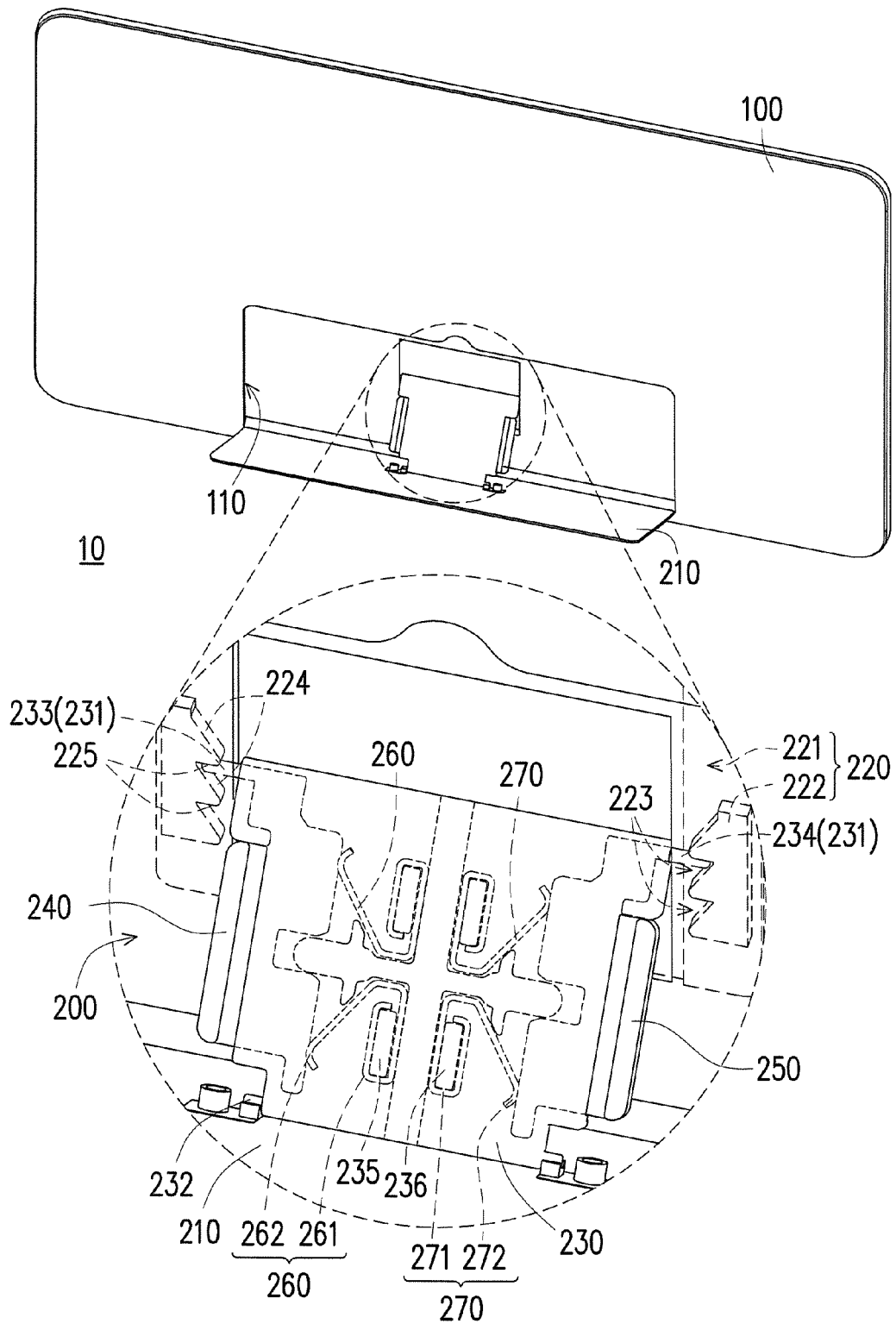

Referring to FIG. 2 to FIG. 4, in the embodiment, the support unit 200 further includes two opposite press units 240 and 250. On the other hand, the first end 231 of the bracket 230 includes two opposite tenons 233 and 234. The tenon 233 is connected to the press unit 240, and the tenon 234 is connected to the press unit 250. The press units 240 and 250 are configured movably at the bracket 230, therefore, the tenons 233 and 234 are retractable in the bracket 230 by pressing the press units 240 and 250. After the tenons 233 and 234 are retracted in the bracket 230, the tenons 233 and 234 move out of the second limiting recesses 223 to the first limiting recesses 223 (or other limiting recesses) selectively. When the external force applied on the press units 240 and 250 are removed, the tenons 233 and 234 move out of the bracket 230 to engage with the first limiting recesses 223 (or other limiting recesses). In such a way, the expansion angle of the cover 210 relative to the housing 100 is adjustable to obtain different view angles.

In the embodiment, the support unit 200 further includes at least two opposite elastic units 260 and 270 (a set of the elastic units 260 and a set of the elastic units 270 are schematically shown). The elastic units 260 and 270 are located between the press units 240 and 250. The press unit 240 abuts against the elastic unit 260, and the press unit 250 abuts against the elastic unit 270. In the embodiment, the bracket 230 includes at least two opposite position limiting portions 235 and 236 (a set of the position limiting portions 235 and a set of the position limiting portions 236 are schematically shown). The position limiting portions 235 and 236 correspond to the elastic units 260 and 270, respectively. The position limiting portions 235 and 236 are located between the elastic units 260 and 270. A fixed portion 261 of the elastic unit 260 is fixed to the position limiting portion 235, and a moving portion 262 of the elastic unit 260 abuts against the press unit 240. Similarly, the fixed portion 271 of the elastic unit 270 is fixed to the position limiting portion 236, and the moving portion 272 of the elastic unit 270 abuts against the press unit 250.

When the press units 240 and 250 are pressed and the tenons 233 and 234 are retracted in the bracket 230, the elastic units 260 and 270 are compressed by the press units 240 and 250. On the other hand, when the external force applied on the press units 240 and 250 is removed, the elastic restoring force of the elastic units 260 and 270 push the press units 240 and 250, respectively, and then the tenons 233 and 234 move out of the bracket 230.

In the embodiment, in the process that the tenons 233 and 234 moves through the forward slopes 224, the tenons 233 and 234 is retracted in the bracket 230 due to the against of the forward slopes 224. At the time, the press units 240 and 250 moves with the tenons 233 and 234 simultaneously to compress the elastic units 260 and 270. When the tenons 233 and 234 pass over the forward slopes 224 to the limiting recesses 223, the elastic restoring force of the elastic units 260 and 270 push the press units 240 and 250, respectively, and then the tenons 233 and 234 move out of the bracket 230 to engage with the limiting recesses 223.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A support unit adapted to a portable electronic device, comprising: a cover pivotably connected to a housing of the portable electronic device and adapted to be received in the housing; a positioning unit fixed to the housing and including a plurality of limiting recesses; and a bracket including a first end and a second end that are opposite to each other, wherein the first end is connected to the positioning unit, and the second end is pivotably connected to the cover, when the cover is expanded out of the housing, the first end of the bracket is driven by the cover to move relative to the positioning unit, and then the first end of the bracket is passed through at least one forward slop of the positioning unit and engaged with one of the limiting recesses of the positioning unit to fix one of expansion angles of the cover relative to the housing corresponding to the engaged limiting recess; and when an external force applied on press units located between the first and second ends of the bracket, the first end of the bracket is retracted and disengaged from the limiting recesses.

2. The support unit according to claim 1, further comprising:
two opposite press units movably configured at the bracket for controlling a movement of the first end relative to the limiting recess.

3. The support unit according to claim 2, wherein the first end includes two opposite tenons, each tenon is connected to the corresponding press unit.

4. The support unit according to claim 2, further comprising:
at least two opposite elastic units located between the press units, wherein each elastic unit abuts against the corresponding press unit.

5. The support unit according to claim 4, wherein the bracket includes at least two opposite position limiting portions, the position limiting portions are located between the elastic units, a fixed portion of each elastic unit is fixed to the corresponding position limiting portion, and a moving portion of each elastic unit abuts against the corresponding press unit.

6. A portable electronic device comprising: a housing; and a support unit including: a cover pivotably connected to the housing and adapted to be received in thehousing; a positioning unit fixed to the housing and including a plurality of limiting recesses; and a bracket including a first end and a second end that are opposite to each other, wherein the first end is connected to the positioning unit, and the second end is pivotably connected to the cover, when the cover is expanded out of the housing, the first end of the bracket is driven by the cover to move relative to the positioning unit, and then the first end of the bracket is passed through at least one forward slop of the positioning unit and engaged with one of the limiting recesses of the positioning unit to fix one of expansion angles of the cover relative to the housing corresponding to the engaged limiting recess; and when an external force applied on press units located between the first and second ends of the bracket, the first end of the bracket is retracted and disengaged from the limiting recesses.

7. The portable electronic device according to claim 6, further comprising:
   two opposite press units movably configured at the bracket for controlling a movement of the first end relative to the limiting recess.

8. The portable electronic device according to claim 7, wherein the first end includes two opposite tenons, and each tenon is connected to the corresponding press unit.

9. The portable electronic device according to claim 7, further comprising:
   at least two opposite elastic units located between the press units, wherein each elastic unit abuts against the corresponding press unit.

10. The portable electronic device according to claim 9, wherein the bracket includes at least two opposite position limiting portions, the position limiting portions are located between the elastic units, a fixed portion of each elastic unit is fixed to the corresponding position limiting portion, and a moving portion of each elastic unit abuts against the corresponding press unit.

* * * * *